US007809912B1

(12) United States Patent
Raizen et al.

(10) Patent No.: US 7,809,912 B1
(45) Date of Patent: Oct. 5, 2010

(54) METHODS AND SYSTEMS FOR MANAGING I/O REQUESTS TO MINIMIZE DISRUPTION REQUIRED FOR DATA MIGRATION

(75) Inventors: Helen S. Raizen, Jamaica Plain, MA (US); Michael E. Bappe, Loveland, CO (US); Todd R. Gill, Medford, MA (US)

(73) Assignee: EMC Corporation, Hopkinton, MA (US)

( * ) Notice: Subject to any disclaimer, the term of this patent is extended or adjusted under 35 U.S.C. 154(b) by 865 days.

(21) Appl. No.: 11/536,995

(22) Filed: Sep. 29, 2006

(51) Int. Cl.
*G06F 13/00* (2006.01)
(52) U.S. Cl. .................. 711/165; 711/114; 711/161; 711/162; 707/640
(58) Field of Classification Search ............... 711/165
See application file for complete search history.

(56) References Cited

U.S. PATENT DOCUMENTS

| 5,742,792 | A | | 4/1998 | Yanai et al. | |
|---|---|---|---|---|---|
| 5,832,263 | A | * | 11/1998 | Hansen et al. | 719/322 |
| 5,835,954 | A | * | 11/1998 | Duyanovich et al. | 711/162 |
| 6,092,161 | A | * | 7/2000 | White et al. | 711/163 |
| 6,145,066 | A | * | 11/2000 | Atkin | 711/165 |
| 6,564,336 | B1 | | 5/2003 | Majkowski | |
| 7,076,690 | B1 | | 7/2006 | Todd et al. | |
| 7,080,221 | B1 | | 7/2006 | Todd et al. | |
| 7,080,225 | B1 | | 7/2006 | Todd | |
| 7,093,088 | B1 | | 8/2006 | Todd et al. | |
| 7,263,590 | B1 | * | 8/2007 | Todd et al. | 711/165 |
| 7,415,591 | B1 | * | 8/2008 | Todd et al. | 711/170 |
| 7,539,828 | B2 | * | 5/2009 | Lomnes | 711/163 |
| 2003/0226059 | A1 | | 12/2003 | Braun | |
| 2004/0080558 | A1 | | 4/2004 | Blumenau et al. | |

OTHER PUBLICATIONS

File downloaded from PAIR for U.S. Appl. No. 11/607,067, Michael E. Bappe et al., filed Dec. 1, 2006, file downloaded through Mar. 3, 2009, 115 pages.
File downloaded from PAIR for U.S. Appl. No. 11/863,745, Bradford B. Glade, et al., filed Sep. 29, 2007, file downloaded through Feb. 25, 2009, 244 pages.
U.S. Appl. No. 10/211,469.
U.S. Appl. No. 10/351,791.
U.S. Appl. No. 10/353,322.

\* cited by examiner

*Primary Examiner*—Hetul Patel
(74) *Attorney, Agent, or Firm*—Daly, Crowley, Mofford & Durkee, LLP

(57) ABSTRACT

Methods and systems are provided for minimizing disruptions when host data on a source logical unit is migrated onto a target logical unit. I/O requests are managed in a particular order during various states of the migration. After the target logical unit is synchronized with the source logical unit and before a commitment to the target logical unit is made, the target logical unit can be evaluated. At that point, the migration can be aborted. During the evaluation of the target logical unit, I/O requests that were directed to the source logical unit are redirected to the target logical unit and I/O requests that were directed to the target logical unit are redirected to the source logical unit. The disclosed methods and systems are equally effective at enabling less disruptive virtualization of a source logical unit as a target logical unit.

20 Claims, 13 Drawing Sheets

METHODS AND SYSTEMS FOR MANAGING I/O REQUESTS TO MINIMIZE DISRUPTION REQUIRED FOR DATA MIGRATION

BACKGROUND

I. Technical Field

The present invention generally relates to the field of moving data.

II. Background Information

Many computer systems include one or more host computers, and one or more storage systems that store data used by the host computers. An example of such a computer system including a host computer 1 and storage systems 3, 4 is shown in FIG. 1.

The storage systems 3, 4 include a plurality of disk drives (5a, 5b or 6a, 6b) and a plurality of disk controllers (7a, 7b or 8a, 8b) that respectively control access to the disk drives. A plurality of storage bus directors (9, 10) control communication with host computer 1 over communication buses (17, 18). Each storage system 3, 4 further includes a cache 11, 12 to provide improved storage system performance. In particular, when the host computer 1 executes a read from one of the storage systems 3, 4, the storage system may service the read from its cache 11, 12 (when the data is stored in the cache) rather than from one of the disk drives 5a, 5b or 6a, 6b to execute the read more efficiently. Similarly, when the host computer 1 executes a write to one of the storage systems 3, 4, corresponding storage bus directors 9, 10 can execute the write to the cache 11, 12. Thereafter, the data can be de-staged asynchronously in a manner transparent to the host computer 1 to the appropriate one of the disk drives 5a, 5b, 6a, 6b. Finally, storage systems 3, 4 include internal buses 13, 14 over which storage bus directors 9, 10, disk controllers 7a, 7b, 8a, 8b and caches 11, 12 communicate.

The host computer 1 includes a processor 16 and one or more host bus adapters 15 that each controls communication between the processor 16 and one of the storage systems 3, 4 via a corresponding one of the communication buses 17, 18. It should be appreciated that rather than a single processor 16, host computer 1 can include multiple processors. Each bus 17, 18 can be any of a number of different types of communication links, with the host bus adapter 15 and storage bus directors 9, 10 being adapted to communicate using an appropriate protocol via the communication buses 17, 18 coupled there between. For example, each of the communication buses 17, 18 can be implemented as a SCSI bus with the storage bus directors 9, 10 and adapters 15 each being a SCSI driver. Alternatively, communication between the host computer 1 and the storage systems 3, 4 can be performed over a Fibre Channel fabric.

Typically, the storage systems 3, 4 make storage resources available to the host computer for assignment to entities therein, such as a file system, a database manager, or a logical volume manager. If the storage systems are so-called "dumb" storage systems, the storage resources that are made available to the host computer will correspond in a one-to-one relationship to physical storage devices within the storage systems. However, when the storage systems are intelligent storage systems, they will present logical units of storage to the host computer 1 that need not necessarily correspond in a one-to-one relationship to any physical storage devices within the storage system. Instead, the intelligent storage systems may map each logical unit of storage presented to the host across one or more physical storage devices.

Administrators of computer systems like that depicted in FIG. 1 may want to migrate sets of logically related data, such as a database or file system, from one storage resource to another. One common reason is that a data set might grow at such a rate that it will soon exceed the capacity of a storage system. Other common reasons include the administrator's desire to move the data set to a storage system with faster response time, to lay the data set out differently on the resource to facilitate faster access, to reconfigure disk striping for fault tolerance and/or performance purposes, or to optimize the geographic location where the data set is physically stored.

Data migrations are often complicated and problematic exercises. Administrators usually must take offline any applications executing on the host that use the source storage device. Depending on the size of the data set, applications can be offline for lengthy periods, leading to a loss of productivity, and opportunity costs associated with not having the data set available for important business functions. Migrations typically are manual labor-intensive efforts, and are therefore error-prone, costly, and labor-intensive.

Conventional data migration efforts typically involve the following four separate steps, requiring manual intervention between each: source discovery, target provisioning, data synchronization (i.e., movement), and reconfiguration to switch to target access.

The source discovery step identifies the physical locations (e.g., the storage system and logical unit) at which the data set is stored. This step is typically performed manually. An exemplary conventional method includes the use of spreadsheets to compile an inventory of file systems, database table spaces, and other data stored on individual storage volumes.

The target provisioning step identifies and configures the storage resources (typically logical units of storage presented by another storage system) to which the data set will be moved. Conventionally, this step requires extensive manual intervention by, for example, database administrators and system administrators. This step may include making new logical units visible to one or more host computers, mapping file systems and/or table spaces on target logical units, configuring switches, configuring volumes for redundancy, and planning for more efficient physical data access. This step is typically very time-consuming and labor-intensive, and thus expensive.

The synchronization step involves moving or copying the data set from the source locations to the target locations. Various techniques have been used to perform this step, including employing a utility application running on one or more host computers to read the data set from the source locations and write the data set to the target locations. Alternatively, a mirroring facility, such as the SYMMETRIX Remote Data Facility (SRDF) available from EMC Corporation, Hopkinton, Mass., may be used to create mirrors between source and target volumes on different storage systems and to then synchronize them so that the storage systems themselves perform the copy. Other data copy tools available from EMC include OPEN REPLICATOR for SYMMETRIX data storage systems and SANCOPY for CLARIION data storage systems. Synchronization is often the most time consuming of the four steps, and usually requires taking the applications that are accessing the data be taken offline (i.e., refused access to the data) while the step is performed.

After the data set has been moved or copied, the switch to target step typically involves reconfiguring the computer system so that applications using the data set recognize the target locations as the new storage location for the data set. Again, this conventionally requires human intervention and may require rebooting of the host computer(s) that access the data set.

EMC Corp. has recognized the desirability of being able to migrate data non-disruptively. U.S. Pat. No. 7,093,088, which is hereby incorporated by reference, for example, discloses some methods and systems that enable less disruptive migration. The inventors of the present invention, however, believed that alternative methods and systems would be more effective and more flexible in enabling less disruptive migration and virtualization of data storage systems.

SUMMARY

The inventors recognized that when migrating data from a source logical device to a target logical device, it would be desirable for a host to be able access the relevant data throughout the process, or at least for as much of the process as possible. The inventors also recognized that when virtualizing a source logical device as a target logical device, it would be desirable for a host to be able access the relevant data throughout the process, or at least for as much of the process as possible. The inventors recognized that the appropriate management of input/output (I/O) requests during the migration or virtualization process can be used to render the process less disruptive to a host that has data stored in a source logical unit. The inventors further recognized that the implementation of various input/output (I/O) request controls in a particular order during the migration or virtualization process can minimize the possibility of errors or other problems.

Possible benefits of management of I/O requests consistent with features and principles of the invention during migration or virtualization process include the capability of leveraging point-in-time copy tools to synchronize the source and target logical units while enabling access to the data thereon, the capability of maintaining synchronization of the source and target logical unit before committing to the target logical unit, the capability of evaluating the target logical unit before committing to the target logical unit, and the capability of switching back and forth between the source logical unit and the target logical unit before committing to the target logical unit. Other possible benefits of management of I/O requests consistent with features and principles of the invention during migration or virtualization process include the capability of using the native name of a device, the capability of applying the same state to all aliases of a device, and the capability of preventing another user from modifying the configuration of a storage device during the process. Further possible benefits of appropriate management of I/O requests include the capability of preventing access to source and target logical units at the same time and the capability of having a state persist across a reboot.

One embodiment consistent with principles of the invention is a method for enabling evaluation of a target logical unit associated with a source logical unit after synchronizing the target logical unit with the source logical unit and before committing to the target logical unit. The method includes redirecting a first plurality of I/O requests that were directed to the source logical unit to the target logical unit and redirecting any I/O requests that were directed to the target logical unit to the source logical unit. The method further includes preventing any I/O requests that were redirected to the source logical unit from accessing the source logical unit.

Another embodiment consistent with principles of the invention is a method for enabling evaluation of a target logical unit after encapsulating a source logical unit in a virtual storage device as the target logical unit and before committing to the target logical unit. The method includes redirecting a first set of I/O requests that were directed to the source logical unit to the target logical unit and redirecting any I/O requests that were directed to the target logical unit to the source logical unit. The method further includes preventing any I/O requests that were redirected to the source logical unit from accessing the source logical unit.

Another embodiment consistent with principles of the invention is a host computer in signal communication via a network with a storage system comprising a source logical unit and a target logical unit. The host computer is configured with instructions to perform one of the foregoing methods.

Another embodiment consistent with principles of the invention is a computer-readable medium including instructions to configure a computer system to execute one of the foregoing methods. In one embodiment, the medium includes a program for installation and execution on a host computer associated with one or more storage systems with a source logical unit and a target logical unit.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Reference is now made in detail to illustrative embodiments of the invention, examples of which are shown in the accompanying drawings.

The inventors of the present invention recognized that the present invention may be implemented, among other ways, as a filter driver in the I/O stack. The POWERPATH tool, available by EMC Corp., is an example of an I/O filter driver. In the exemplary embodiment illustrated in FIG. 2, the invention is implemented as an extension to the POWERPATH tool.

Figure 1:
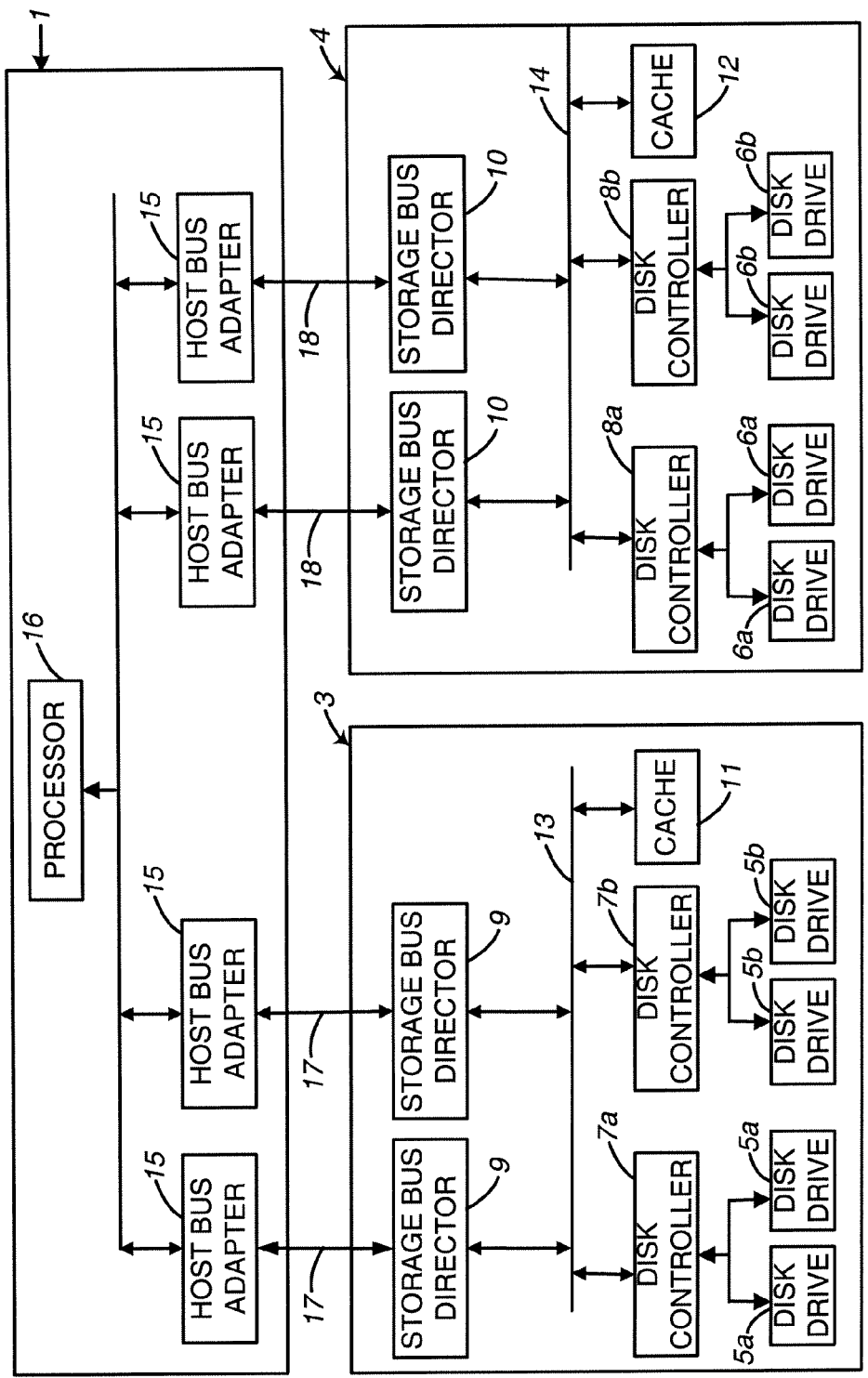
FIG. 1 is an exemplary computer system in which data may be migrated, consistent with an embodiment of the present invention.
Figure 2:
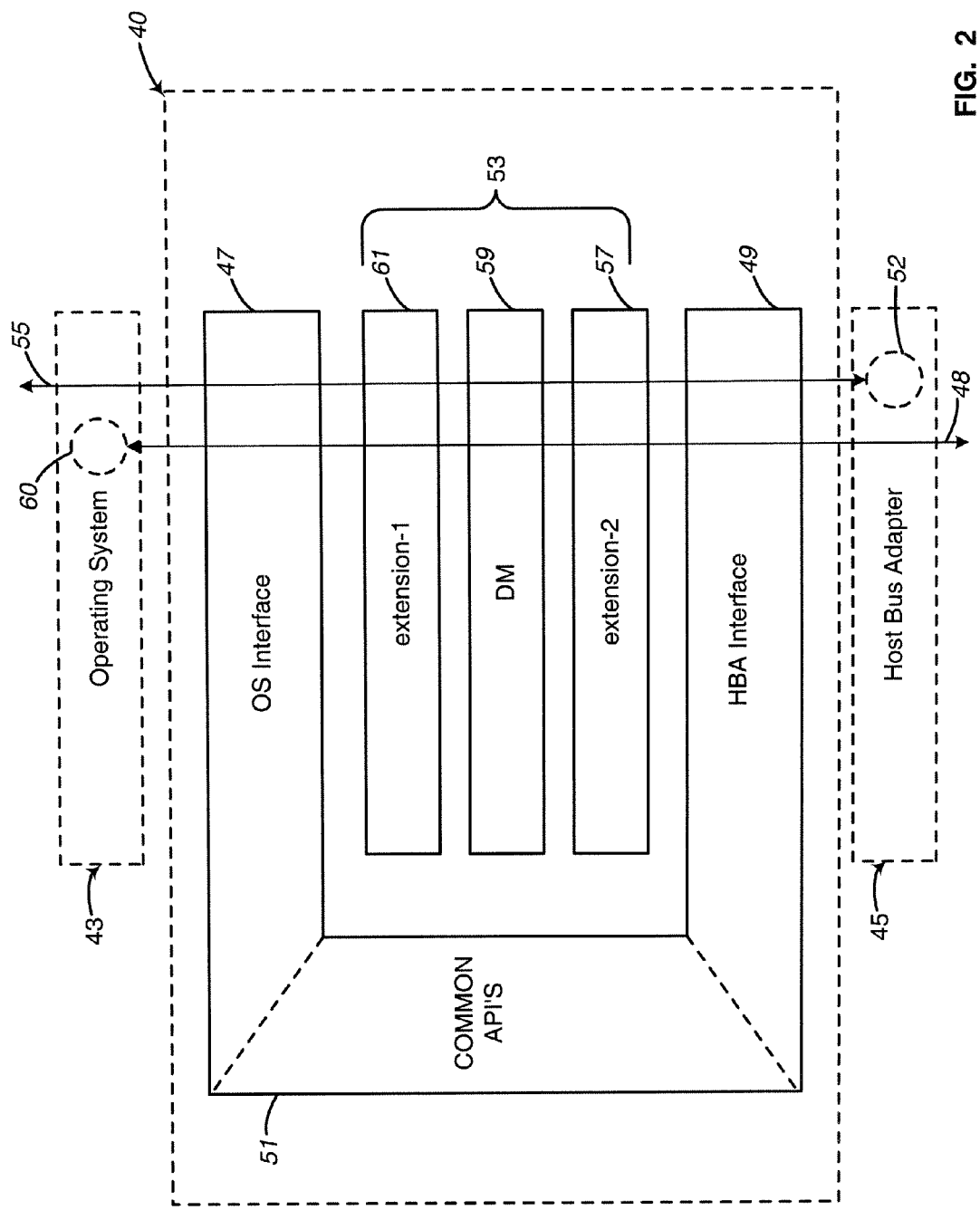
FIG. 2 is an exemplary software architecture for managing I/O request during migration or virtualization, consistent with an embodiment of the present invention.

Although filter driver 40 only interacts with an operating system (OS) 43, as illustrated in FIG. 2, filter driver 40 can conceptually be considered to be placed between OS 43 and at least one host bus adapter 45, such as host bus adapter 15 in FIG. 1. The storage system, such as storage system 3 in FIG. 1, presents volumes of storage to the host computer for assignment to various resources therein, such as to provide storage space for a file system, an LVM, or a database. Volumes are presented via signals arriving at the collection of host bus adapters 45 on the host. These signals are processed by filter driver 40, which creates a volume representation 60. Functionality may be attributed to the volume representation.

Filter driver 40 of FIG. 2 may be thought of conceptually as having the form of a "C" clamp with a top horizontal arm 47, a bottom horizontal arm 49, and a vertical connector 51 between the arms. Horizontal arm 47 may be, for example, an interface to any operating system (OS) such as Sun's SOLARIS, LINUX, and Microsoft's WINDOWS NT. Bottom horizontal arm 49 includes platform-dependent code comprising an interface to relevant host bus adapters 48. Vertical connector 51 comprises a series of common Application Programming Interfaces (APIs). An advantage of the C clamp is that extensions can be written in a platform-independent manner because the arms 47, 49 translate all of the platform-dependent communications into more generic communications. An extension stack 53 is enveloped between arms 47 and 49. In addition to a plurality of existing extensions 61, 57 in extension stack 53, a data migration extension 59 is added in the embodiment of FIG. 2 to manage I/O requests during a data migration or virtualization process. Data migration extension 59 can consist of a plurality of extensions.

Figure 3:
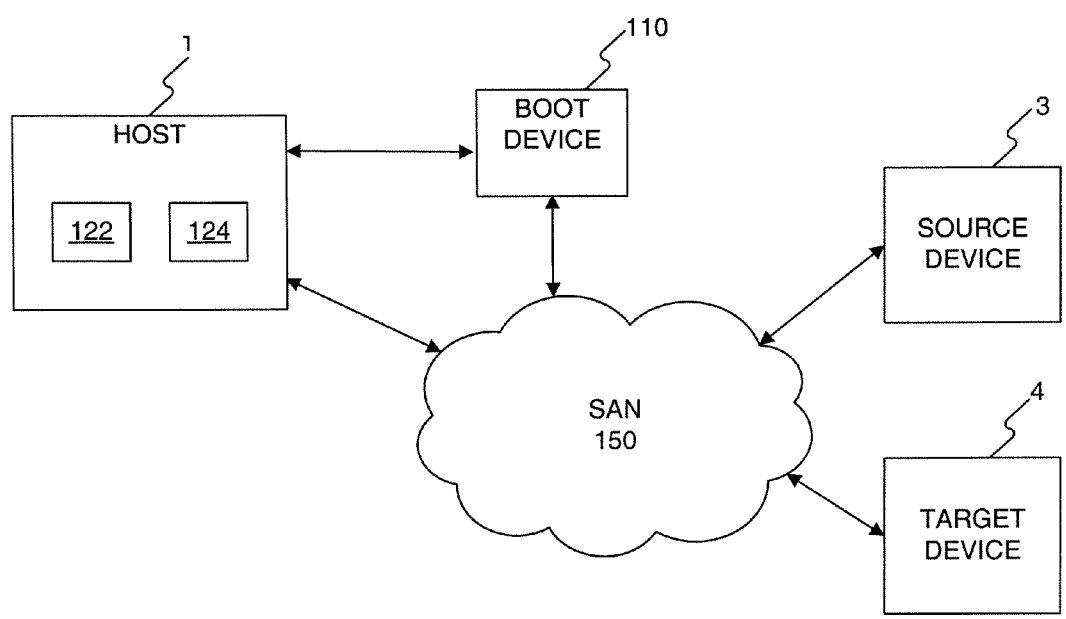
FIG. 3 is related exemplary software architecture for managing I/O request during migration or virtualization, consistent with an embodiment of the present invention.

FIG. 3 illustrates exemplary architecture for managing I/O requests during migration or virtualization. FIG. 3 includes at least one host computer 1, a boot device 110, a network 150, and at least two logical units 500. Network 150 enables communication between host computer 1, source logical unit 500-1, and target logical unit 500-2. Network 150 may also enable communication between host computer 1 and boot device 110. Network 150 may be, for example, a Fibre Channel fabric. Alternatively, network 150 may include, among other components, SCSI buses 17, 18 and SCSI drivers 9, 10, 15 all of FIG. 1.

Host computer 1 uses source logical unit 500-1 to store data. The host data on source logical unit 500-1 can be migrated to target logical unit 500-2. During a migration or virtualization process, host computer can store data about the state and/or status of the process in boot device 110. This metadata may be stored in the boot device 110, for example, as kernel metadata or user metadata. Storing kernel and/or user metadata can enable the process to resume in the same state after either a crash or a graceful shutdown and restart during the migration or virtualization process. To enable the host computer 1 to resume the process smoothly after a crash, boot device 110 must be the first device the host computer accesses during the host boot process. Accordingly, the host computer 1 may enable the kernel state of the process to be restored during a reboot.

Figure 4:
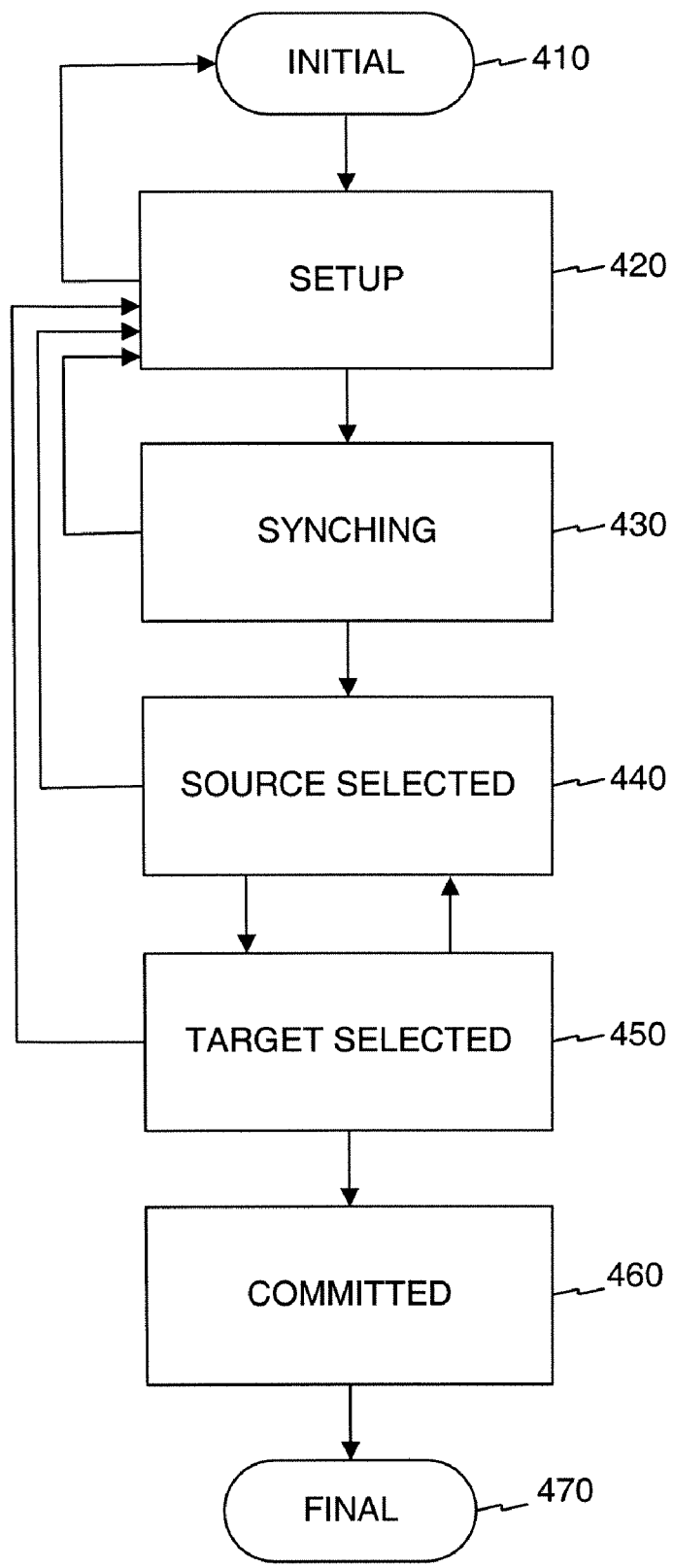
FIG. 4 is a diagram of exemplary states in a migration process, consistent with an embodiment of the present invention.

FIG. 4 is a diagram 400 of exemplary states of a migration of data from a source logical unit accessed by the host application through a pseudo name to a target logical unit accessed by the host application through a pseudo name (pseudo-to-pseudo migration), consistent with an embodiment of the present invention. During a migration, a user can control, using among other things a program running in user space and filter driver 40, the migration through transitions between different stages that are referred to as "states." Changing from one state to another state is referred to as a "state transition." As shown in FIG. 4, arrows represent possible state transitions that may occur during a migration. Initial state 410 of FIG. 4 is a state that exists prior to any migration operation.

Setup state 420 is reached after a SETUP command, which is initiated by a user, initializes a migration operation. In the setup state 420, all preparation required before synchronization of a target logical unit with a source logical unit is completed. Additionally, setup state 420 may also be reached as a result of aborting a migration. From setup state 420, the user has the choice of continuing to a synching state 430, or returning to an initial state 410, which eliminates the state changes that were made to reach setup state 420.

Synching state 430 is reached after a SYNC command initiates a synchronization of a target logical unit with a source logical unit, such as a target logical unit 500-2 and source logical unit 500-1. In synching state 430, data from source logical unit 500-1 is in the process of being copied to target logical unit 500-2. Once source storage logical unit 500-1 and target logical unit 500-2 are synchronized (i.e., both units store the same data), synching state 430 automatically transitions to a source selected state 440. Alternatively, the user may choose to return to the setup state 420 from the synching state 430.

In source selected state 440, the source logical unit and target logical unit are synchronized and data in those logical units is accessed via the source logical unit. The migration process is not yet committed. Thus, the user may choose to return to setup state 420 from source selected state 440. To continue the migration process, however, the user may issue a command to move to a target selected state 450.

Target selected state 450 is reached after the user issues a SELECT TARGET command while the migration process is in source selected state 440. In target selected state 450, the source logical unit and target logical unit are synchronized and data on both the source and target logical units is accessed on the target logical unit. The migration process is not yet committed. Thus, the user may choose to return to source selected state 440 or setup state 420 from the target selected state 450. To continue the migration process, however, the user may issue a command to move to a committed state 460.

In a migration of data from a source logical unit accessed by a host application through a native name (native-to-any migration), a committed-and-redirected state 455 (not shown) exists between target selected state 450 and committed state 460. Committed-and-redirected state 455 is reached after the user issues a COMMIT command while the migration process is in target selected state 450. If the feature that directs write clones to source logical unit was enabled in the target selected state, it is disabled in committed-and-redirected state 455. Thus, the migration process cannot be aborted from committed-and-redirected state 455. The user may issue the COMMIT command after he is satisfied with an evaluation of the target logical unit. The committed-and-redirected state 455 enables the user to post-pone to a more convenient time the reconfiguration required in a native-to-any migration to transition to the committed state 460. Reconfiguration requires host application disruption.

In a pseudo-to-pseudo migration, committed state 460 is reached after the user issues a COMMIT command while the migration process is in target selected state 450. In committed state 460, a source logical unit is no longer kept synchronized with a target logical unit. Thus, the migration process cannot be aborted from committed state 460. The user may issue the commit command after he is satisfied with an evaluation of the target logical unit.

Final state 470 is reached after a CLEANUP command. Before allowing access to the source logical unit in a migration process, the CLEANUP command removes any data or metadata from the source logical unit that might cause OS or application confusion or errors. Before allowing access to the source logical unit in a virtualization process, the CLEANUP command verifies that the source logical unit is no longer physically accessible to the host.

As discussed above, various commands may be issued by the user to transition from one state to another. For example, a SYNC command will transition a migration from setup state 420 to synching state 430. A SELECT TARGET command will transition the migration from source selected state 440 to target selected state 450. A COMMIT command will transition the migration process from target selected state 450 to committed state 460. Additional commands are available to the user, such as a SELECT SOURCE command. For example, when the system is in target selected state 450, the SELECT SOURCE command will transition from target selected state 450 to source selected state 440, as represented by the arrow shown in FIG. 4. Furthermore, as shown by the arrows in FIG. 4, a transition may be made from any state in FIG. 4 except committed state 460 and final state 470 back to setup state 420. A transition back to setup state 420 constitutes an abort of the migration process.

Figure 5:
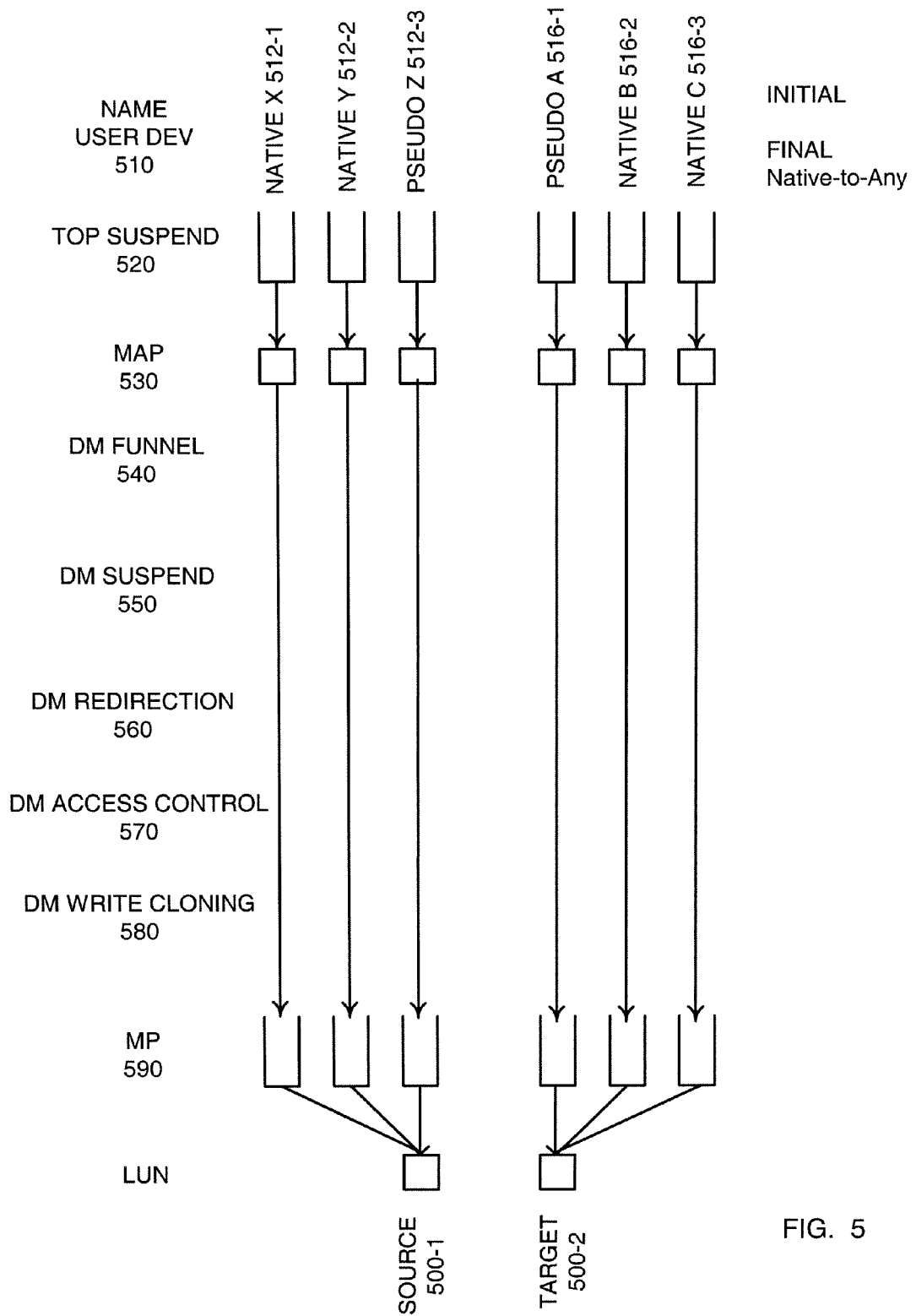
FIG. 5 is a diagram of an exemplary flow of I/O requests during a state of migration, consistent with an embodiment of the present invention.

FIG. 5 is a flow diagram conceptually illustrating exemplary management of I/O requests at various layers in initial state 410 of FIG. 4, consistent with an embodiment of the present invention. Initial state 410 exists before the migration process is initiated. At the bottom of FIG. 5, a source logical unit 500-1 and a target logical unit 500-2 are illustrated. Management of I/O requests from a host is illustrated beginning at stage 510.

Each user device 512 in layer 510 of FIG. 5 represents a way that source logical unit 500-1 may be addressed by a host I/O request. For example, logical units may be addressed with native names or pseudo names. Native X 512-1 represents a first native name of source logical unit 500-1. Native Y 512-2 represents a second native name of source logical unit 500-1. Although two native names are illustrated in the example, the number of native names can vary. Generally, where the invention treats native X 512-1 and native Y 512-Y similarly, any additional native names would also be treated similarly. Pseudo Z 512-3 represents a pseudo name of source logical unit 500-1. Similarly, each user device 516 in layer 510 of FIG. 5 represents a way that target logical unit 500-2 may be addressed by a host I/O request. Pseudo A 516-1 represents a pseudo name of target logical unit 500-1. Native B 516-2 represents a first native name of target logical unit 500-2. Native C 516-3 represents a second native name of target logical unit 500-2.

Co-pending U.S. patent application Ser. No. 11/427,889, which is entitled "Methods And Systems For Migrating Data With Minimal Disruption" and which was filed on Jun. 30, 2006 naming M. Bappe and H. Raizen as inventors, is hereby incorporated by reference. This application discloses, among other things, methods and systems whereby I/O requests can reach a logical unit using a pseudo name.

Layers 520, 530, and 590 are each managed by one or more existing extensions 61, 57 of the extension stack 53 shown in FIG. 2 in this exemplary embodiment. Layer 520 of FIG. 5 represents a first layer at which I/O requests addressed to a logical unit may be suspended. Suspended I/O requests may be queued so that they can be executed when an appropriate Table 1 summarizes exemplary management of I/O requests in various layers during states in the migration process identified in FIG. 4.

| STATE | Setup | Synching | Source Selected | Target Selected | Committed & Redirected | Committed |
|---|---|---|---|---|---|---|
| Funnel | on (source & target) | on (source & target) | on (source & target) | on (source & target) | on (source & target) | on (source & target) |
| I/O direction | none | none | none | cross (2-way) redirection | cross (2-way) redirection | none |
| Access Control | none or target | target | target | source | source | source |
| Write Cloning, if enabled | none | source to target | source to target | target to source | none | none |

Table 1

Exemplary Management of I/O Requests in Different States

FIGS. 5-11 elaborate on Table 1 and illustrate exemplary flows of I/O requests during various states identified in FIG. 4. For consistency, FIGS. 5-11 each illustrate the same levels in the flow of I/O requests. Each of the illustrated levels, however, may not be relevant to any single state.

state has been reached. Layer 530 of FIG. 5 represents a mapping layer. Layer 530 in initial state 410 maps a pseudo and/or native name—used by a host application in level 510 to access data on a logical unit, such as native X 512-1, native Y 512-2, or pseudo Z 512-3—to an inherent device identifier of a logical unit or of a physical connection to a logical unit. This mapping is shown conceptually in FIG. 5 and elsewhere as a path to a logical unit.

Layers 540, 550, 560, 570, and 580 may be managed by data migration extension 59 of FIG. 2 in the exemplary embodiment. To increase the processing speed, I/O requests need not flow through layers 540, 550, 560, 570, and 580 prior to the initiation of a migration process.

Layer 590 in FIG. 5 represents a multipath layer. In initial state 410, layer 590 maps I/O requests that were on paths addressed by native X 512-1, native Y 512-2, and pseudo Z 512-3 in level 510, to source logical unit 500-1. Thus, layer 590 will route an I/O request that was addressed to native X 512-1, to native Y 512-2, or to pseudo Z 512-3 in level 510 on a path to source logical unit 500-1. In initial state 410, layer 590 similarly maps I/O requests that were on paths addressed by native X 512-1, native Y 512-2, and pseudo Z 512-3 in level 510, to target logical unit 500-2. Thus, layer 590 will route an I/O request that was addressed to pseudo A 516-1, native B 516-2, or native C 516-3 in level 510 on a path to target logical unit 500-2.

Figure 6:
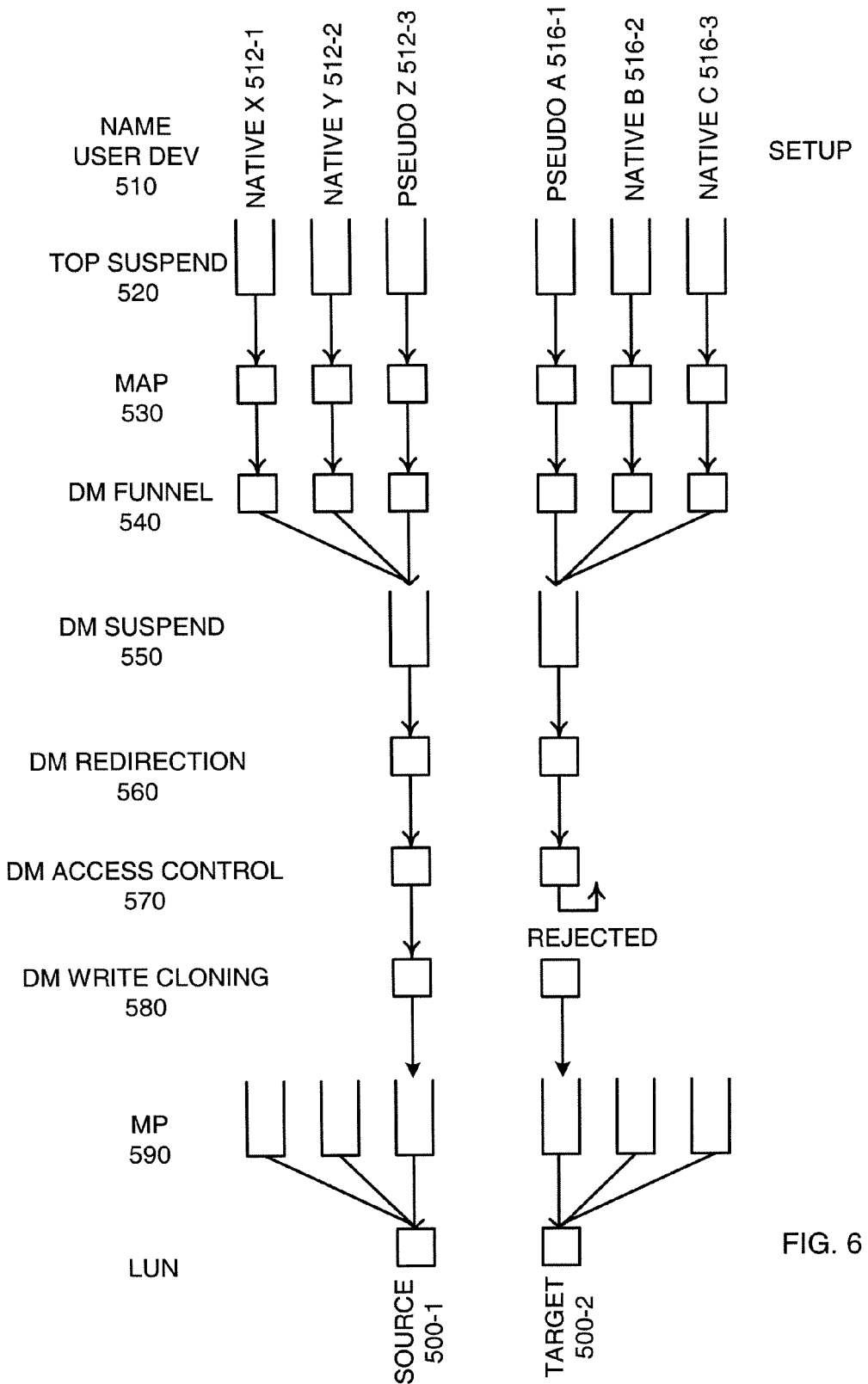
FIG. 6 is a diagram of an exemplary flow of I/O requests during a state of migration, consistent with an embodiment of the present invention.

FIG. 6 is a flow diagram conceptually illustrating exemplary management of I/O requests at various layers in setup state 420 of FIG. 4, consistent with an embodiment of the present invention. Setup state 420 is reached, for example, after a setup command, which is initiated by a user, initializes a migration operation. Management of I/O requests from a host is illustrated beginning at layer 510 in FIG. 6. I/O requests in layers 510, 520, 530, and 590 of FIG. 6 are managed similarly to I/O requests in layers 510, 520, 530, and 590 of FIG. 5.

Layer 540 of FIG. 6 represents a layer at which I/O requests addressed in various ways to a logical unit may be funneled to a single path directed to a particular logical unit. Funneling is the process of redirecting I/Os from aliases to a nominal device. The nominal device is the one specified in the SETUP command. If the nominal device is specified by a native name of a physical connection to a logical unit, then the pseudo name of the logical unit would be an alias and all other native names of physical connections to the logical unit would be aliases. If the nominal device is specified by a pseudo name of a logical unit, then all of the native names of the physical connections to the logical unit are aliases. Funneling simplifies I/O handling. After funneling is applied, aliases are not a concern because all I/O flows through the nominal device. Suspend, redirect, access-control and write-cloning need be applied only to the nominal device.

Consistent with an embodiment of the invention, layer 540 in FIG. 6 funnels I/O requests that were addressed to native X 512-1, native Y 512-2, and pseudo Z 512-3 in level 510 to the path corresponding to the pseudo Z 512-3 address when pseudo Z 512-3 is specified as the nominal device. I/O requests that were addressed to any other native name for source logical unit 500-1 would be treated similarly. Also consistent with an embodiment of the invention, layer 540 in FIG. 6 funnels I/O requests that were addressed to pseudo A 516-1 native B 516-2, and native C 516-3 in level 510 to the path corresponding to the pseudo A 516-1 address when pseudo A 516-1 is specified as the nominal device. Level 540 is not a necessary part of the invention.

Layer 550 of FIG. 6 represents a second layer at which I/O requests addressed to a logical unit may be suspended and later resumed. Layer 550 is used to transition between different states, such as target select state 450 and committed state 460. A state change is initiated, for example, by issuing a state change command such as a COMMIT command. Layer 550 allows I/O requests that are pending before a state change is initiated to execute. I/O requests that arrive after a state change is initiated, however, are queued in layer 550 so that they can be executed when an appropriate state has been reached. In any of the states such as setup state 420, I/O requests are not suspended in layer 550.

Layer 560 of FIG. 6 represents a layer at which I/O requests may be redirected to a different logical unit. In setup state 420, I/O requests are not redirected in layer 550.

Layer 570 of FIG. 6 represents a layer at which I/O requests may be prevented from accessing a logical unit. In setup state 420, I/O requests may be prevented from accessing target logical unit 500-2 in layer 570 as illustrated in FIG. 6. Access control is useful to prevent problems that could be caused by the same data or metadata appearing on two different logical units.

Layer 580 of FIG. 6 represents a layer at which I/O write requests may be cloned and directed to a second logical unit. In setup state 420, layer 590 of FIG. 6 only receives I/O requests from one path for each logical unit 500.

Figure 7:
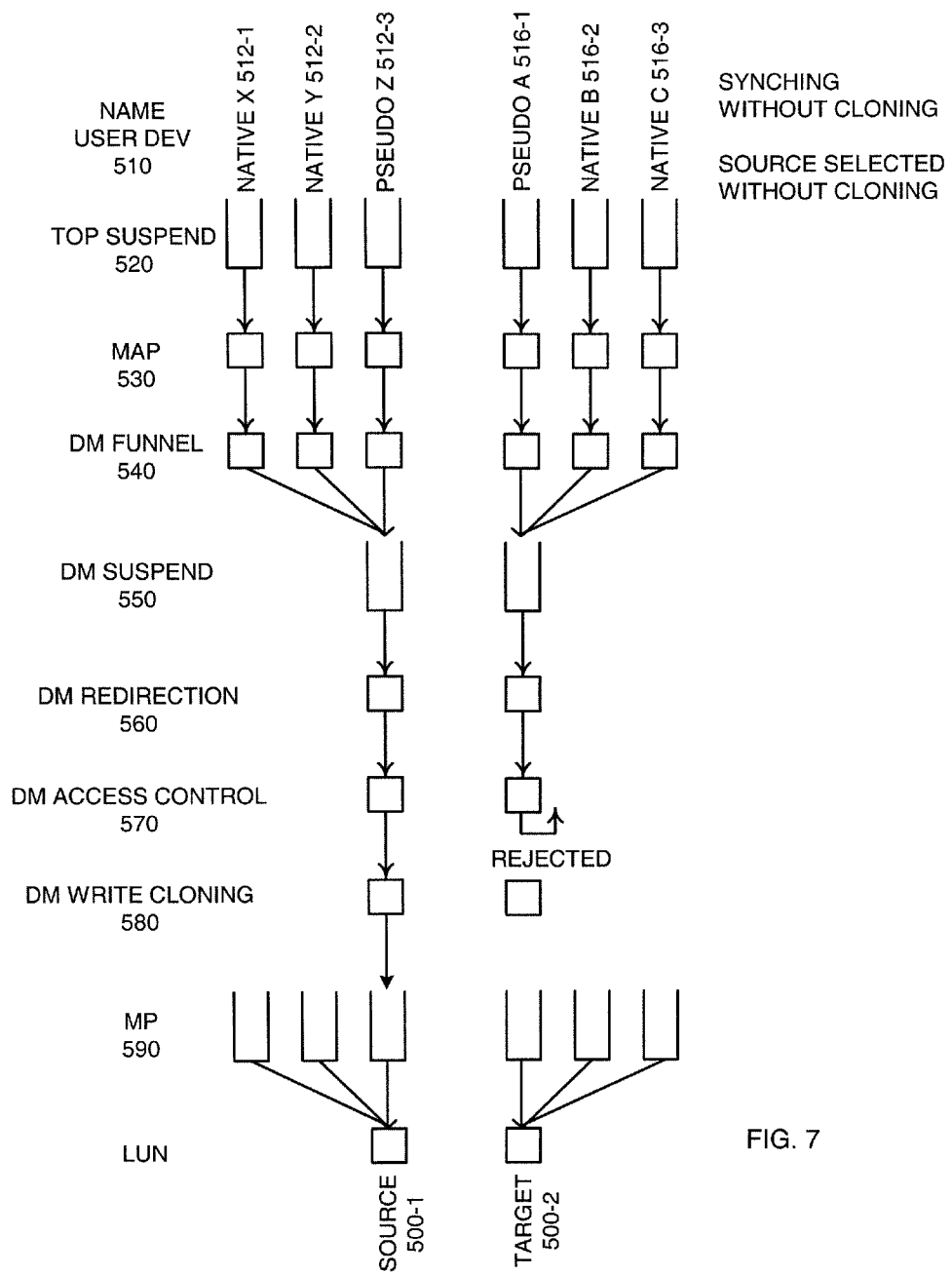
FIG. 7 is a diagram of an exemplary flow of I/O requests during a state of migration, consistent with an embodiment of the present invention.

FIG. 7 is a flow diagram conceptually illustrating exemplary management of I/O requests at various layers in synching state 430 of FIG. 4, consistent with an embodiment of the present invention. Synching state 430 is reached, for example, after a SYNC command. The SYNC command may include an option to enable write cloning, or sending a copy of a write request to one logical unit to another logical unit. In some embodiments of the invention, as part of the SYNC command, the user will specify a tool to be used to synchronize the target logical unit with the source logical unit. Such tools can include, for example, OPEN REPLICATOR and SYMMETRIX SRDF, both of which are available from EMC Corp. Such tools can also include third party synchronization tools. Depending on the features of the selected tool, the synching state 430 may differ slightly.

When SYMMETRIX SRDF is the selected tool, for example, the present invention would go to the synching state 430 conceptually illustrated in FIG. 7 because the SRDF tool keeps the mirrors synchronized and host-based write cloning would not be enabled. Management of I/O requests in synching state 430 is illustrated beginning at layer 510 in FIG. 7. I/O requests in layers 510, 520, 530, 540, 550, 560, 580, and 590 of FIG. 7 are managed similarly to I/O requests in layers 510, 520, 530, 540, 550, 560, 580, and 590 of FIG. 6. In synching state 430 of FIG. 7, however, I/O requests following a path to target logical unit 500-2 are prevented from accessing any logical unit in layer 570. The synching state 430 conceptually illustrated in FIG. 7 does not include write cloning because the selected tool keeps the mirrored copy synchronized with the original.

FIG. 7 also conceptually illustrates the source selected state 440 for a migration process in which SYMMETRIX SRDF is the selected tool in a SYNC command, consistent with an embodiment of the present invention.

Figure 8:
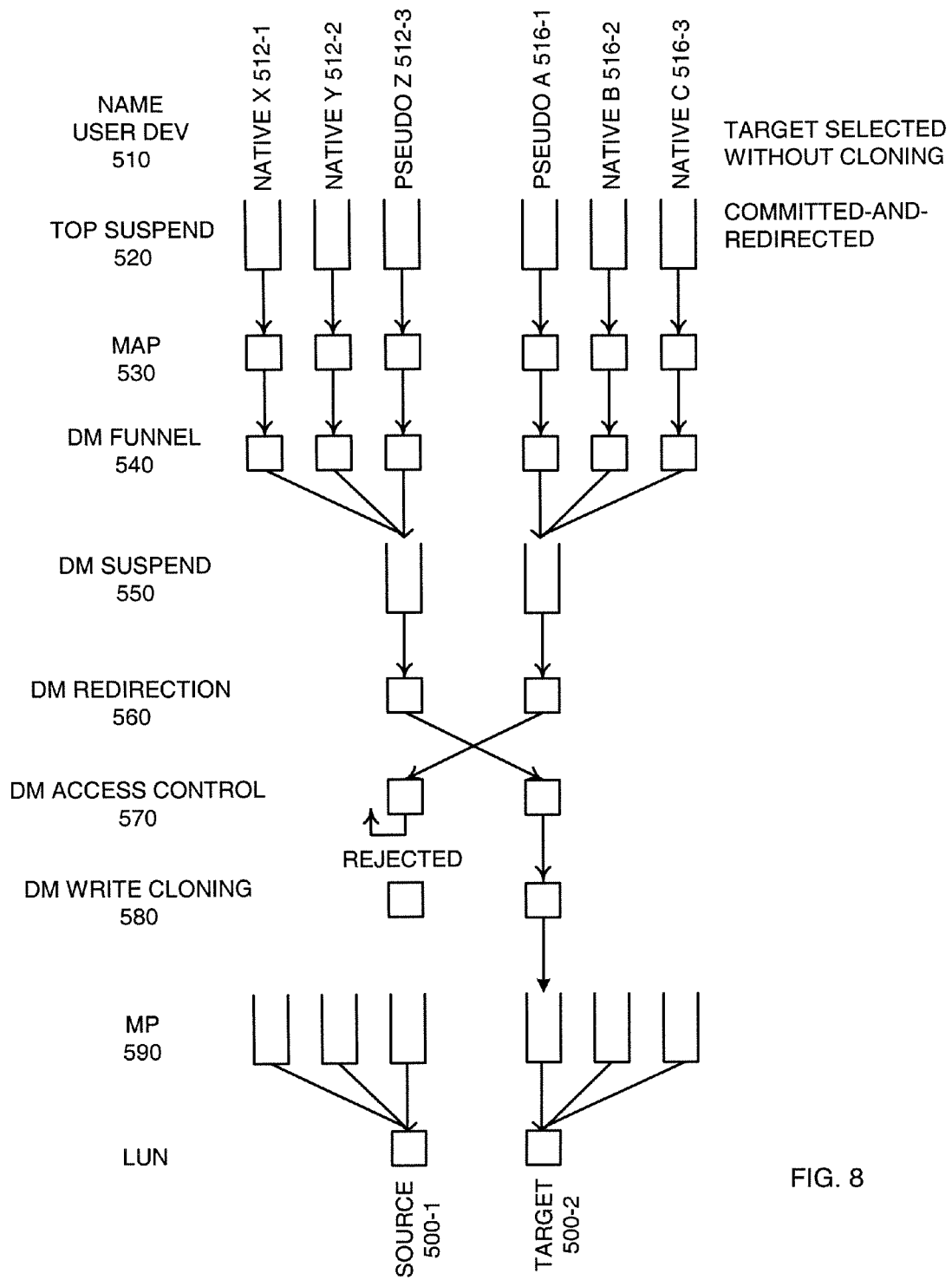
FIG. 8 is a diagram of an exemplary flow of I/O requests during a state of migration, consistent with an embodiment of the present invention.

FIG. 8 is a flow diagram conceptually illustrating exemplary management of I/O requests at various layers in target selected state 450 of FIG. 4, consistent with an embodiment of the present invention. The target selected state 450 illustrated in FIG. 8 can be reached, for example, after a SETUP command identifying SYMMETRIX SRDF as the selected synchronization tool, a SYNC command, and a TARGET SELECT command are issued. The target selected state 450 illustrated in FIG. 8 can be reached, for another example, after a SETUP command, a SYNC command identifying SYMMETRIX SRDF as the selected synchronization tool, and a TARGET SELECT command are issued.

I/O requests in layers 510, 520, 530, 540, 550, 580, and 590 of FIG. 8 are managed similarly to I/O requests in layers 510, 520, 530, 540, 550, 580, and 590 of FIG. 7. In target selected state 450 of FIG. 8, however, I/O requests that had been directed to source logical unit 500-1 are redirected to target logical unit 500-2 in level 560. In target state 450 of FIG. 8, I/O requests that had been directed to target logical unit 500-2 are also redirected to source logical unit 500-1 in level 560. Such cross-redirection in level 560 is considered advantageous because it enables all I/O requests to a particular logical unit 500 to be managed uniformly thereby creating certainty in how they will be handled, because redirection from the source to the target allows application I/O to continue without the need to reconfigure, and because redirection from the target to the source prevents alternative (dangerous) access while the target is selected. For native migrations, the committed-and-redirected state 455 enables application reconfiguration to be postponed until a convenient time.

Like in FIG. 7, some I/O requests are prevented from accessing any logical unit in layer 570 of FIG. 8. I/O requests following a path to target logical unit 500-1 in layer 550 of FIG. 8 are redirected in layer 560, then prevented from accessing any logical unit in layer 570.

Figure 9:
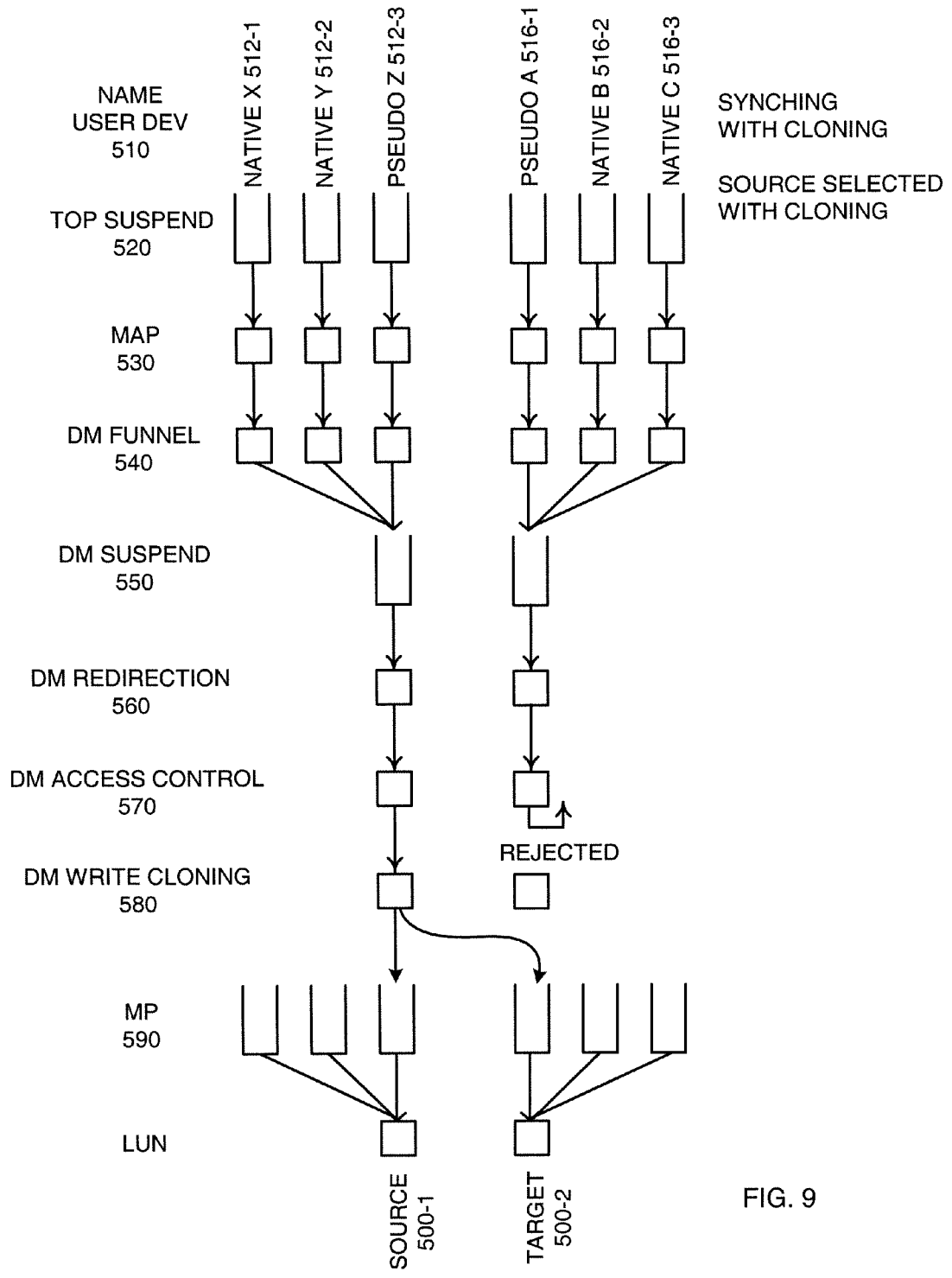
FIG. 9 is a diagram of an exemplary flow of I/O requests during a state of migration, consistent with an embodiment of the present invention.

Like FIG. 7, FIG. 9 is a flow diagram conceptually illustrating exemplary management of I/O requests at various layers in synching state 430 of FIG. 4, consistent with an embodiment of the present invention. Where OPEN REPLICATOR is the tool selected for synchronization, the present invention may transition to the synching state 430 conceptually illustrated in FIG. 9 because the OPEN REPLICATOR tool does not attempt to keep the target logical unit 500-2 synchronized with the source logical unit 500-1. Instead, the OPEN REPLICATOR tool copies the data on source logical unit 500-1 at a point-in-time onto target logical unit 500-2. I/O requests in layers 510, 520, 530, 540, 550, 560, 570, and 590 of FIG. 9 are managed similarly to I/O requests in layers 510, 520, 530, 540, 550, 560, 570, and 590 of FIG. 7. In synching state 430 of FIG. 9, however, write requests directed to source logical unit 500-1 are cloned and the cloned write requests are directed to target logical unit 500-2 in layer 580.

FIG. 9 also conceptually illustrates the source selected state 440 for a migration process in which OPEN REPLICATOR is the selected tool in a SYNC command, consistent with an embodiment of the present invention.

Figure 10:
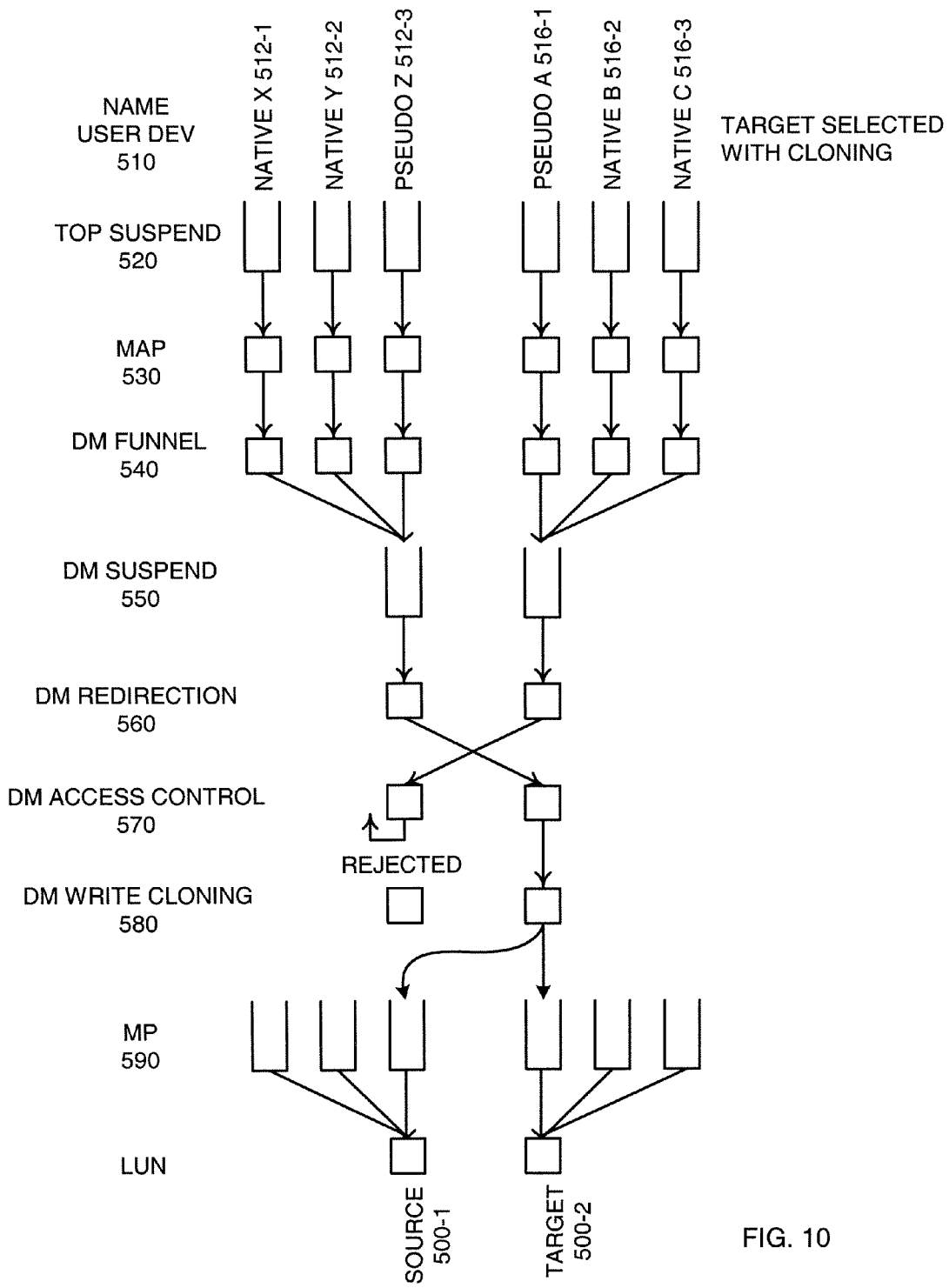
FIG. 10 is a diagram of an exemplary flow of I/O requests during a state of migration, consistent with an embodiment of the present invention.

FIG. 10 is a flow diagram conceptually illustrating exemplary management of I/O requests at various layers in target selected state 450 of FIG. 4, consistent with an embodiment of the present invention. The target selected state 450 illustrated in FIG. 10 can be reached, for example, after a SETUP command and a SYNC command, one of which identifies OPEN REPLICATOR as the selected synchronization tool, and a TARGET SELECT command are issued.

I/O requests in layers 510, 520, 530, 540, 550, 560, 570, and 590 of FIG. 10 are managed similarly to I/O requests in layers 510, 520, 530, 540, 550, 560, 570, and 590 of FIG. 8. In target selected state 450 of FIG. 10, however, write requests directed to target logical unit 500-2 are cloned and the cloned write requests are directed to source logical unit 500-1 in layer 580.

Figure 11:
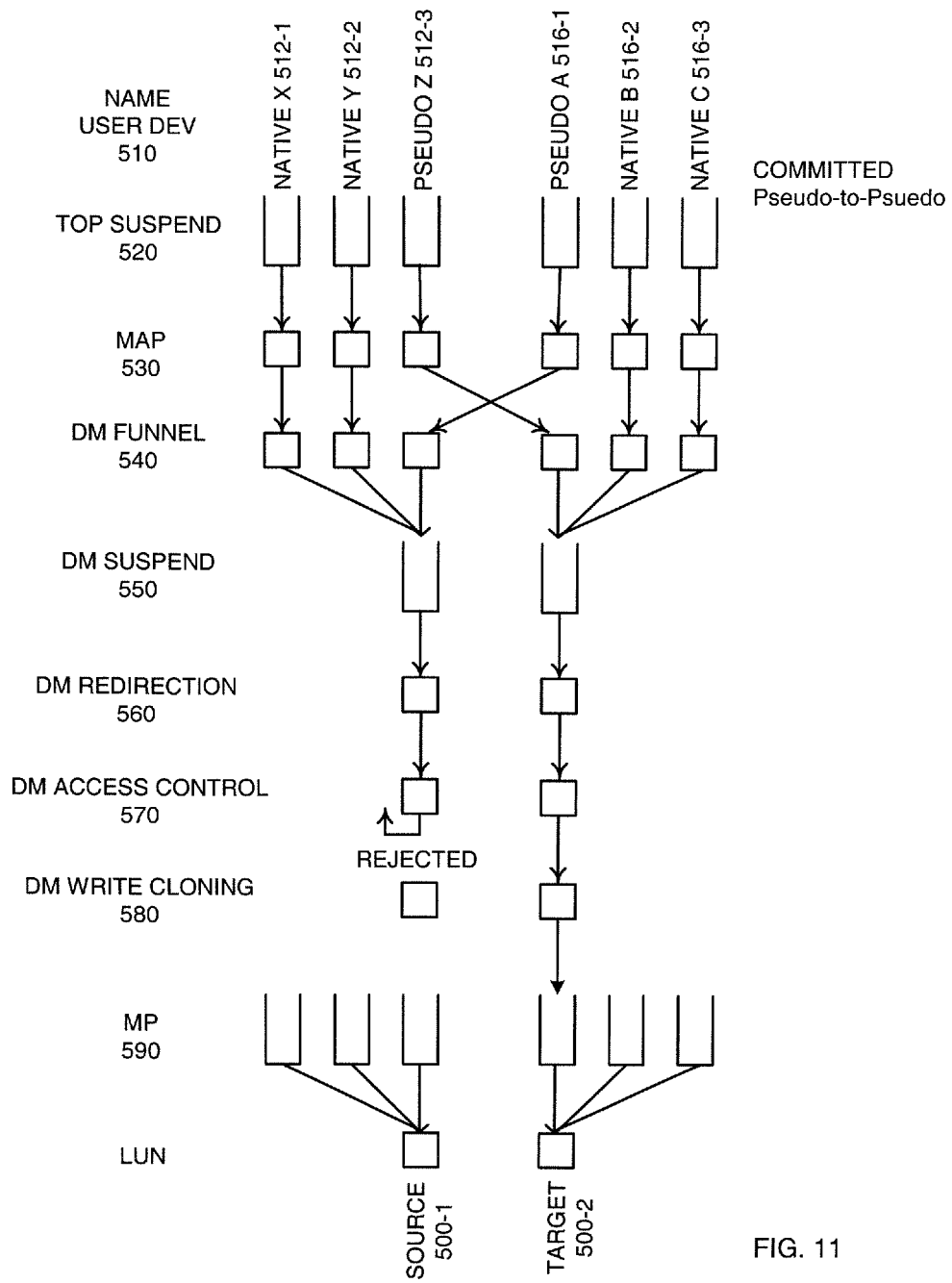
FIG. 11 is a diagram of an exemplary flow of I/O requests during a state of migration, consistent with an embodiment of the present invention.

In this pseudo-to-pseudo migration example, the committed state 460 described with respect to FIG. 4 is reached, for example, after a COMMIT command is issued. FIG. 11 illustrates a committed state 460 for a pseudo-to-pseudo migration. As previously discussed, layer 570 in FIG. 8 prevents I/O requests that are following a path to source logical unit 500-1 from accessing any logical unit. Unlike layer 560 of FIG. 8, however, layer 560 in FIG. 11 does not redirect I/O requests. Instead, layer 530 of FIG. 11 maps I/O requests addressed to source logical unit 500-1 by a pseudo name, such as pseudo Z 512-3, in layer 510 to a path to target logical unit 500-2. Similarly, layer 530 of FIG. 11 maps I/O requests addressed to target logical unit 500-2 by a pseudo name, such as pseudo A 516-1, in layer 510 to a path to source logical unit 500-1. Co-pending U.S. patent application Ser. No. 11/427,889, which is entitled "Methods And Systems For Migrating Data With Minimal Disruption" which was previously incorporated by reference, discloses methods and systems whereby I/O requests can reach a logical unit using a pseudo name. Remapping of the relationship between a pseudo name and an underlying logical unit is an important feature of the committed state 460 of a pseudo-to-pseudo migration.

The committed state 460 of FIG. 11 does not illustrate a way to prevent I/O requests addressed to target logical unit 500-1 by a native name, such as native B 516-2 or native 516-3, in layer 510 from accessing target logical unit. However, the invention may only allow a logical unit to be addressed by a pseudo name.

Referring again to FIG. 8, a committed-and-redirected state 455 is illustrated for a native-to-any migration. As previously discussed, layer 560 in FIG. 8 redirects I/O requests that had been directed to target logical unit 500-2 to source logical unit 500-1, and also redirects I/O requests that had been directed to source logical unit 500-1 to target logical unit 500-2. As previously discussed, layer 570 in FIG. 8 prevents I/O requests following a path to source logical unit 500-1 from accessing any logical unit. Thus, in the committed-and-redirected state 455 of FIG. 8, I/O requests addressed to source logical unit 500-1 in layer 510 are redirected to target logical unit 500-2 and I/O requests addressed to target logical unit 500-2 in layer 510 are prevented from accessing any logical unit.

Figure 12:
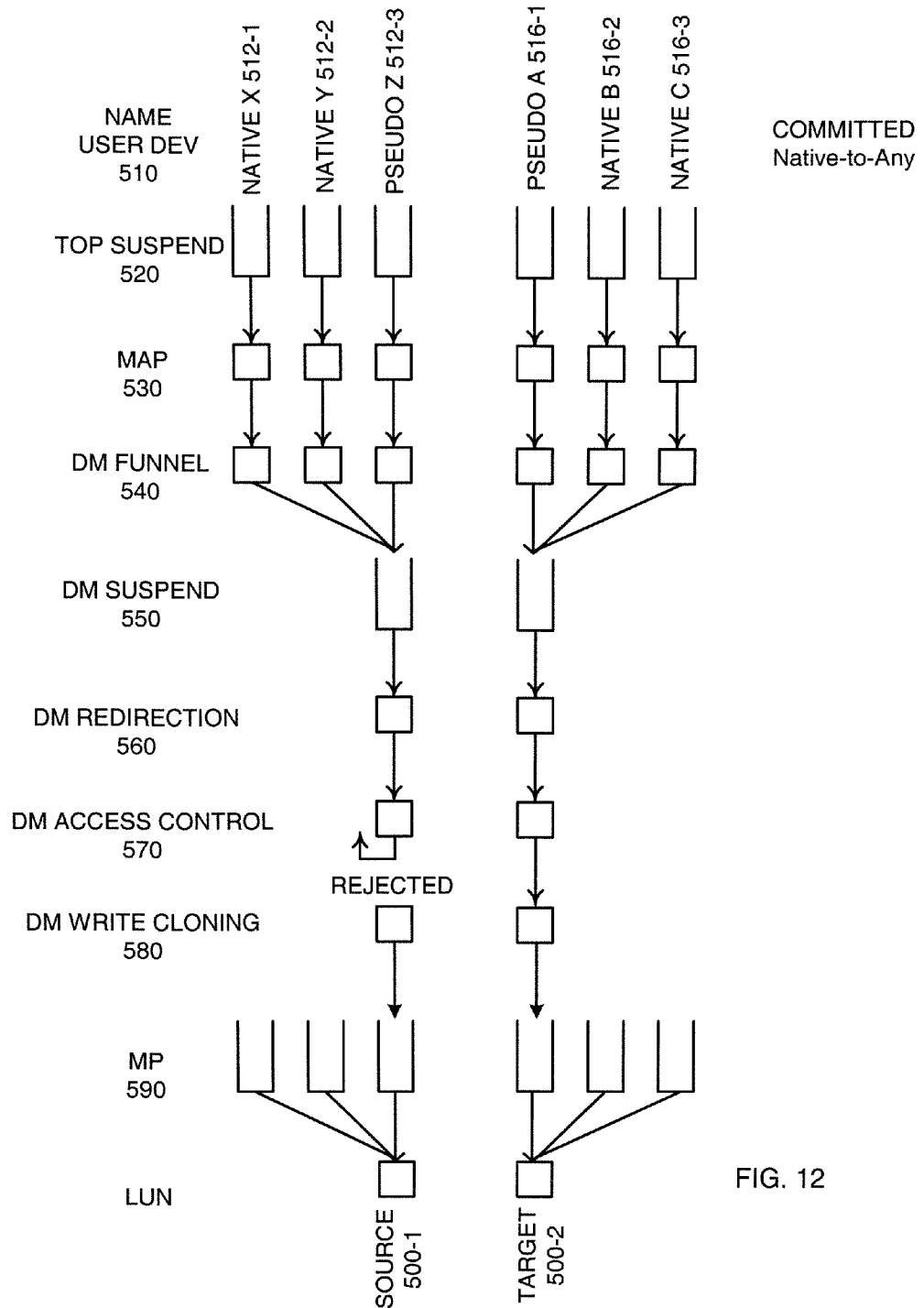
FIG. 12 is a diagram of an exemplary flow of I/O requests during a state of migration, consistent with an embodiment of the present invention.

Referring to FIG. 12, a committed state 460 for a native-to-any migration is illustrated. An UNDO REDIRECT command initiates the transition from a committed-and-redirected state 455 to the committed state 460. This requires that any uses of source logical unit 500-1 be shut down and those uses be reconfigured to use target logical unit 500-2 using either a native or pseudo name. Layer 540 in FIG. 12 funnels I/O requests addressed in various ways to a logical unit and directs them to a single path directed to a particular logical unit.

Figure 13:
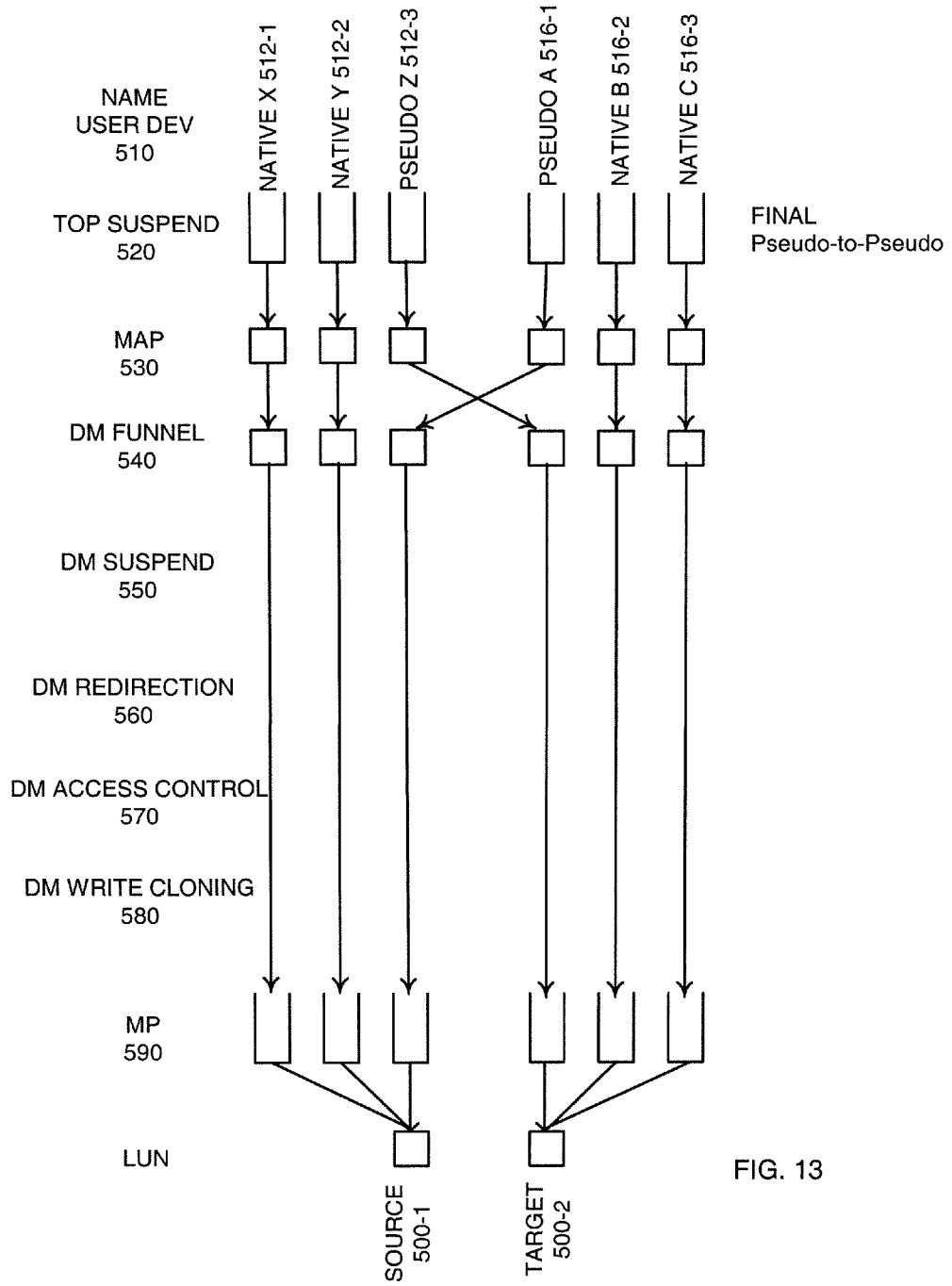
FIG. 13 is a diagram of an exemplary flow of I/O requests during a state of migration, consistent with an embodiment of the present invention.

Furthermore, the transition to final state 470 described with respect to FIG. 4 is initiated by the issuance of a CLEANUP command in committed state 460. Before the final state 470 is reached, all access control in level 570 is disabled and data may be removed from the source logical unit 500-1. FIG. 5 illustrates the final state 470 for a native-to-any migration. FIG. 13 illustrates the final state 470 for a pseudo-to-pseudo migration.

One of ordinary skill in the art will appreciate that other variations of the above-described processes are in keeping with the spirit and scope of the present invention. For example, the virtualization process may involve similar steps and similar states as those described above. Moreover, management of I/O requests consistent with features and principles of the invention can be used to render the virtualization process less disruptive to a host that has data stored in a source logical unit. In a virtualization process, the target logical unit 500-2 is a virtual volume that encapsulates the source logical unit 500-1.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for enabling evaluation of a target logical unit associated with a source logical unit after synchronizing the target logical unit with the source logical unit but before committing to the target logical unit, the method comprising:
    redirecting a first plurality of I/O requests that were directed to the source logical unit to the target logical unit;
    redirecting I/O requests that were directed to the target logical unit to the source logical unit; and
    preventing I/O requests that were redirected to the source logical unit from accessing the source logical unit.

2. The method of claim 1 further comprising directing clones of a plurality of write I/O requests in the first plurality of I/O requests to the source logical unit.

3. The method of claim 1 further comprising enabling I/O requests for the source logical unit to be addressed to a native name or a pseudo name of the source logical unit.

4. The method of claim 3 further comprising:
    creating the first plurality of I/O requests by directing to the source logical unit any I/O request that is addressed to a native name of the source logical unit; and
    directing to the source logical unit any I/O request that is addressed to a pseudo name of the source logical unit.

5. The method of claim 3 further comprising saving migration state information in association with an identifier of a source logical unit.

6. The method of claim 1 further comprising returning to a state preceding the evaluation of the target logical unit by:
    terminating the redirection of I/O requests that were directed to the target logical unit and the redirection of I/O requests that were directed to the source logical unit;
    enabling I/O requests that were directed to the source logical unit to access the source logical unit; and
    preventing I/O requests that were directed to the target logical unit from accessing the target logical unit.

7. The method of claim 6 wherein evaluation of a target logical unit associated with a source logical unit after synchronizing the target logical unit with the source logical unit but before committing to the target logical unit further comprises:
    directing clones of the write I/O requests in the first plurality of I/O requests to the source logical unit; and
    wherein returning to a state preceding the evaluation of the target logical unit further comprises
    directing clones of write I/O requests that were directed to the source logical unit to the target logical unit.

8. The method of claim 1 further comprising committing to the target logical unit by:
    terminating the redirection of I/O requests that were directed to the target logical unit and the redirection of I/O requests that were directed to the source logical unit;
    unmapping a pseudo name of the source logical unit from the source logical unit;
    unmapping a pseudo name of the target logical unit from the target logical unit;
    mapping a pseudo name of the source logical unit to the target logical unit;
    mapping a pseudo name of the target logical unit to the source logical unit; and
    preventing any I/O requests that were directed to the pseudo name of the target logical unit from accessing the source logical unit.

9. The method of claim 1 further comprising committing to the target logical unit by terminating the synchronization state while maintaining a current management state for I/O requests.

10. The method of claim 1 further comprising aborting a migration process while enabling evaluation of the target logical by:
    terminating the redirection of I/O requests that were directed to the target logical unit and the redirection of I/O requests that were directed to the source logical unit;
    enabling I/O requests that were directed to the source logical unit to access the source logical unit; and
    preventing I/O requests that were directed to the target logical unit from accessing the target logical unit.

11. A method, comprising:
    enabling evaluation of a target logical unit associated with a source logical unit after synchronizing the target logical unit with the source logical unit, the enabling comprising:
        redirecting a first plurality of I/O requests that were directed to the source logical unit to the target logical unit, wherein the first plurality of I/O requests comprises write I/O requests;
        redirecting a second plurality of I/O requests that were directed to the target logical unit to the source logical unit;
        preventing the second plurality of I/O requests that were redirected to the source logical unit from accessing the source logical unit; and
        directing clones of the write I/O requests in the first plurality of I/O requests to the source logical unit.

12. The method of claim 11 further comprising:
    creating the first plurality of I/O requests by directing to the source logical unit any I/O request that is addressed to a native name; and
    directing to the source logical unit any I/O request that is addressed to a pseudo name of the source logical unit.

13. The method of claim 11 further comprising returning to a state preceding the evaluation of the target logical unit by:

terminating the redirection of I/O requests that were directed to the target logical unit and the redirection of I/O requests that were directed to the source logical unit;
enabling I/O requests that were directed to the source logical unit to access the source logical unit;
preventing I/O requests that were directed to the target logical unit from accessing the target logical unit; and
directing clones of the write I/O requests in the first plurality of I/O requests to the target logical unit.

14. The method of claim 11 further comprising committing to the target logical unit by terminating the directing clones of the write I/O requests in the first plurality of I/O requests to the source logical unit while maintaining a current management state for I/O requests.

15. The method of claim 11 further comprising aborting a migration process while enabling evaluation of the target logical by:
terminating the cloning of the write I/O requests in the first plurality of I/O requests and the directing of clones of the write I/O requests to the source logical unit;
terminating the redirection of I/O requests that were directed to the target logical unit and the redirection of I/O requests that were directed to the source logical unit;
enabling I/O requests that were directed to the source logical unit to access the source logical unit; and
preventing I/O requests that were directed to the target logical unit from accessing the target logical unit.

16. A method, comprising:
enabling evaluation of a target logical unit after encapsulating a source logical unit in a virtual storage device as the target logical unit, the enabling comprising:
redirecting a first set of I/O requests that were directed to the source logical unit to the target logical unit;
redirecting a second set of I/O requests that were directed to the target logical unit to the source logical unit; and
preventing the second set of I/O requests that were redirected to the source logical unit from accessing the source logical unit.

17. The method of claim 16 further comprising returning to a state preceding the evaluation of the target logical unit by:
terminating the redirection of I/O requests that were directed to the target logical unit and the redirection of I/O requests that were directed to the source logical unit;
enabling I/O requests that were directed to the source logical unit to access the source logical unit; and
preventing I/O requests that were directed to the target logical unit from accessing the target logical unit.

18. The method of claim 16 further comprising committing to the target logical unit by:
terminating the redirection of I/O requests that were directed to the target logical unit and the redirection of I/O requests that were directed to the source logical unit;
unmapping a pseudo name of the source logical unit from the source logical unit;
unmapping a pseudo name of the target logical unit from the target logical unit;
mapping a pseudo name of the source logical unit to the target logical unit;
mapping a pseudo name of the target logical unit to the source logical unit; and
preventing any I/O requests that were directed to the pseudo name of the target logical unit from accessing the source logical unit.

19. The method of claim 16 further comprising committing to the target logical unit.

20. The method of claim 16 further comprising aborting a migration process while enabling evaluation of the target logical by:
terminating the redirection of I/O requests that were directed to the target logical unit and the redirection of I/O requests that were directed to the source logical unit;
enabling I/O requests that were directed to the source logical unit to access the source logical unit; and
preventing I/O requests that were directed to the target logical unit from accessing the target logical unit.

* * * * *